(12) United States Patent
You et al.

(10) Patent No.: US 7,952,266 B2
(45) Date of Patent: May 31, 2011

(54) WHITE PHOSPHOR, LIGHT EMISSION DEVICE INCLUDING THE SAME, AND DISPLAY DEVICE

(75) Inventors: Yong-Chan You, Suwon-si (KR);
Jae-Woo Bae, Suwon-si (KR);
Gyeong-Jae Heo, Suwon-si (KR);
Sang-Hyuk Lee, Suwon-si (KR);
Kyu-Chan Park, Suwon-si (KR);
Sun-Hwa Kwon, Suwon-si (KR);
Ji-Hyun Kim, Suwon-si (KR);
Young-Suk Cho, Suwon-si (KR);
Ui-Song Do, Suwon-si (KR);
Hui-Young Ku, Suwon-si (KR);
Yoo-Jung Lee, Suwon-si (KR);
Byung-Kyun Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 285 days.

(21) Appl. No.: 12/186,844

(22) Filed: Aug. 6, 2008

(65) Prior Publication Data

US 2009/0051268 A1 Feb. 26, 2009

(30) Foreign Application Priority Data

Aug. 21, 2007 (KR) .................. 10-2007-0083949

(51) Int. Cl.
*H01J 1/62* (2006.01)
(52) U.S. Cl. ........... 313/496; 252/301.6 S; 252/301.4 S; 252/301.4 R
(58) Field of Classification Search .................. 313/414, 313/441–460, 495–497, 293–304, 306, 309–310, 313/346, 351, 355; 252/500, 301.4 R, 301.4 S, 252/301.6 S
See application file for complete search history.

(56) References Cited

U.S. PATENT DOCUMENTS

| 7,336,023 B2 * | 2/2008 | Youh et al. ............... 313/112 |
| 2005/0012447 A1 | 1/2005 | Komatsu et al. |
| 2005/0264170 A1 * | 12/2005 | Oh .............................. 313/497 |
| 2008/0258110 A1 * | 10/2008 | Oshio .................. 252/301.6 R |

FOREIGN PATENT DOCUMENTS

| EP | 0148110 | 12/1984 |
| EP | 1273645 | 1/2003 |
| EP | 1775751 | 4/2007 |
| GB | 2144445 | 3/1985 |
| KR | 10-0315106 | 11/2001 |
| KR | 2005-109369 | 11/2005 |

OTHER PUBLICATIONS

Office Action issued in corresponding European Patent Application No. 08161961.1 dated Nov. 11, 2008.
SIPO Office Action dated Feb. 23, 2011 of the corresponding Chinese Patent Application No. 200810129750.3 and English translation thereof (record only).

* cited by examiner

*Primary Examiner* — Nimeshkumar D Patel
*Assistant Examiner* — Donald L Raleigh
(74) *Attorney, Agent, or Firm* — Christie, Parker & Hale, LLP

(57) ABSTRACT

A white phosphor, and a light emission device including the white phosphor, and a display device including the white phosphor, the white phosphor including 40 to 45 parts by weight of a blue phosphor selected from the group consisting of $ZnS:(Ag,Cl)$, $ZnS:(Ag,Al)$, $ZnS:(Ag,Al,Cl)$, and combinations thereof; 30 to 40 parts by weight of a green phosphor selected from the group consisting of $ZnS:(Cu,Al)$, $ZnS:(Cu,Au,Al)$, and combinations thereof; and 20 to 25 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and combinations thereof. The white phosphor shows a color temperature of from 12,000K and 14,000K.

23 Claims, 4 Drawing Sheets

WHITE PHOSPHOR, LIGHT EMISSION DEVICE INCLUDING THE SAME, AND DISPLAY DEVICE

CROSS-REFERENCE TO RELATED APPLICATION

This application claims priority to and the benefit of Korean Patent Application No. 2007-83949 filed in the Korean Intellectual Property Office on Aug. 21, 2007, the entire content of which is incorporated herein by reference.

BACKGROUND OF THE INVENTION

1. Field of the Invention

Aspects of the present invention relate to a white phosphor, and a light emission device including the white phosphor, and a display device including the light emission device. More particularly, aspects of the present invention relate to a white phosphor having an appropriate color temperature, due to a combination of red, green, and blue phosphors.

2. Description of the Related Art

A liquid crystal display that is one of a variety of flat panel display devices that display an image by varying a light transmission amount at each pixel, using the dielectric anisotropy of liquid crystal, which varies according to an applied voltage. The liquid crystal display is lighter weight, more compact, and has lower power consumption, as compared with a conventional cathode ray tube.

A liquid crystal display includes a liquid crystal (LC) panel assembly, and a backlight unit to emit light toward the LC panel assembly. The LC panel assembly receives the light from the backlight unit, and uses a liquid crystal layer to selectively transmit the light.

The backlight unit is classified according to light source-type, one of which is a cold cathode fluorescent lamp (CCFL). However, since the CCFL has relatively high power consumption, and is difficult to produce in large sizes, due to structure limitations, it is hard to apply it to a large-sized liquid crystal display, i.e. a display of over 30 inches.

A backlight unit employing light emitting diodes (LEDs) is also well known. The LED-type backlight unit has a fast response time and good color reproduction characteristics. However, LEDs are costly, and increase an overall thickness of a liquid crystal display.

As described above, all of the conventional backlight units have inherent problems. In addition, the conventional backlight units are driven so as to maintain a predetermined brightness all over a light emission surface, when the liquid crystal display is driven. Therefore, it is difficult to improve the display quality to a sufficient level.

For example, when the LC panel assembly is to display a high contrast image, in response to an image signal, a higher contrast can be realized, if the backlight unit can emit light of different intensities to different pixels of the LC panel assembly. However, the conventional backlight units cannot achieve the above function, and thus, there is a limitation in improving the dynamic contrast of an image.

SUMMARY OF THE INVENTION

One exemplary embodiment of the present invention provides a white phosphor that includes red, green, and blue phosphors at a predetermined ratio, in accordance with an appropriate color temperature. Another embodiment of the present invention provides a light emission device having improved luminescence characteristics, and a display device including the light emission device as a backlight unit.

According to an exemplary embodiment of the present invention, provided is a white phosphor that includes: 40 to 45 parts by weight of a blue phosphor selected from the group consisting of $ZnS:(Ag,Cl)$, $ZnS:(Ag,Al)$, $ZnS:(Ag,Al,Cl)$, and combinations thereof; 30 to 40 parts by weight of a green phosphor selected from the group consisting of $ZnS:(Cu,Al)$, $ZnS:(Cu,Au,Al)$, and combinations thereof; and 20 to 25 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and combinations thereof.

According to another exemplary embodiment of the present invention, provided is a light emission device that includes first and second substrates arranged opposite to each other, an electron emission unit disposed on a surface of the first substrate, and a light emission unit disposed on one surface of the second substrate. The light emission unit includes a phosphor layer including the above white phosphor.

According to yet another exemplary embodiment of the present invention, provided is a display device that includes the light emission device, and a liquid crystal panel assembly disposed on the front of the light emission device, to receive the light emitted from the light emission device, so as to display an image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
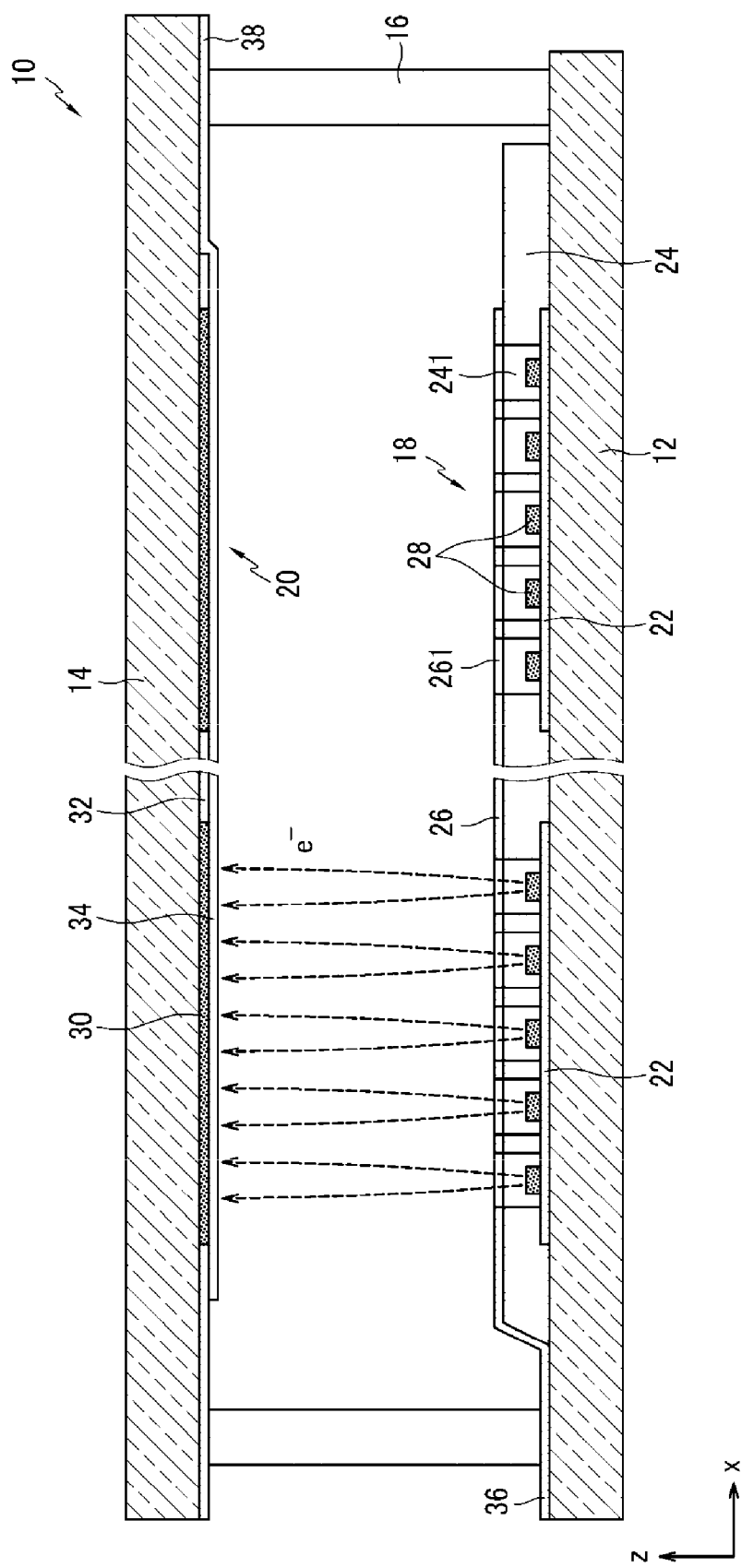
FIG. 1 is a sectional view of a light emission device according to an embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

A white phosphor, according to one embodiment of the present invention, includes: 40 to 45 parts by weight of a blue phosphor selected from the group consisting of $ZnS:(Ag,Cl)$, $ZnS:(Ag,Al)$, $ZnS:(Ag,Al,Cl)$, and combinations thereof; 30 to 40 parts by weight of a green phosphor selected from the group consisting of $ZnS:(Cu,Al)$, $ZnS:(Cu,Au,Al)$, and combinations thereof; and 20 to 25 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and combinations thereof.

In one embodiment, the amount of the blue phosphor ranges from 40 to 44 parts by weight, and in another embodiment, it ranges from 41 to 43 parts by weight. In one embodiment, the amount of the green phosphor ranges from 32 to 37 parts by weight, and in another embodiment, it ranges from 33 to 36 parts by weight. In one embodiment, the amount of the red phosphor ranges from 22 to 25 parts by weight, and in another embodiment, it ranges from 23 to 24 parts by weight.

When the content of the blue phosphor exceeds the upper limit of the mixing parts by weight, the color temperature increases, but the luminance decreases. When the content of the green phosphor exceeds the upper limit of the mixing parts by weight, the luminance increases, while the color temperature decreases, and a resulting color difference produces a greenish-white color. When the content of the red phosphor exceeds the upper limit of the mixing parts by weight, the luminance decreases, and a reddish-white color is produced, thereby decreasing the color temperature.

When the content of the blue phosphor is less than the lower limit of the mixing parts by weight, the luminance increases, but the color temperature decreases. When the content of the green phosphor is less than the lower limit of the mixing parts by weight, the luminance decreases, and the color temperature increases. When the content of the red phosphor is less than the lower limit of the mixing parts by weight, a resulting color difference produces a greenish-white color, which is a problem.

The color coordinate of the white phosphor is controlled by adjusting a mixing weight ratio of the blue, green, and red phosphors. For example, when the white phosphor includes 40 to 45 parts by weight of the blue phosphor, 30 to 40 parts by weight of the green phosphor, and 20 to 25 parts by weight of the red phosphor, and is excited by electron beams, the white phosphor has a color temperature of from 11,000 to 14,000K.

In one embodiment, the white phosphor includes 40 to 44 parts by weight of the blue phosphor, 32 to 37 parts by weight of the green phosphor, and 22 to 25 parts by weight of the red phosphor, and when it is excited by electron beams, it has a color temperature of from 11,000 to 14,000K. In one embodiment, the white phosphor includes 41 to 43 parts by weight of the blue phosphor, 33 to 36 parts by weight of the green phosphor, and 23 to 24 parts by weight of the red phosphor, and when it is excited by electron beams, it has a color temperature of from 12,000K to 14,000K.

The light emission device, according to one embodiment of the present invention, includes first and second substrates arranged opposite to each other, an electron emission unit disposed on one surface of the first substrate, and a light emission unit disposed on one surface of the second substrate. The light emission unit includes a phosphor layer disposed on one surface of the second substrate. The phosphor layer includes the white phosphor.

The display device, according to one embodiment of the present invention, includes the light emission device, and a liquid crystal panel assembly disposed on the front of the light emission device. The panel assembly receives light emitted from the light emission device, to display an image.

Figure 2:
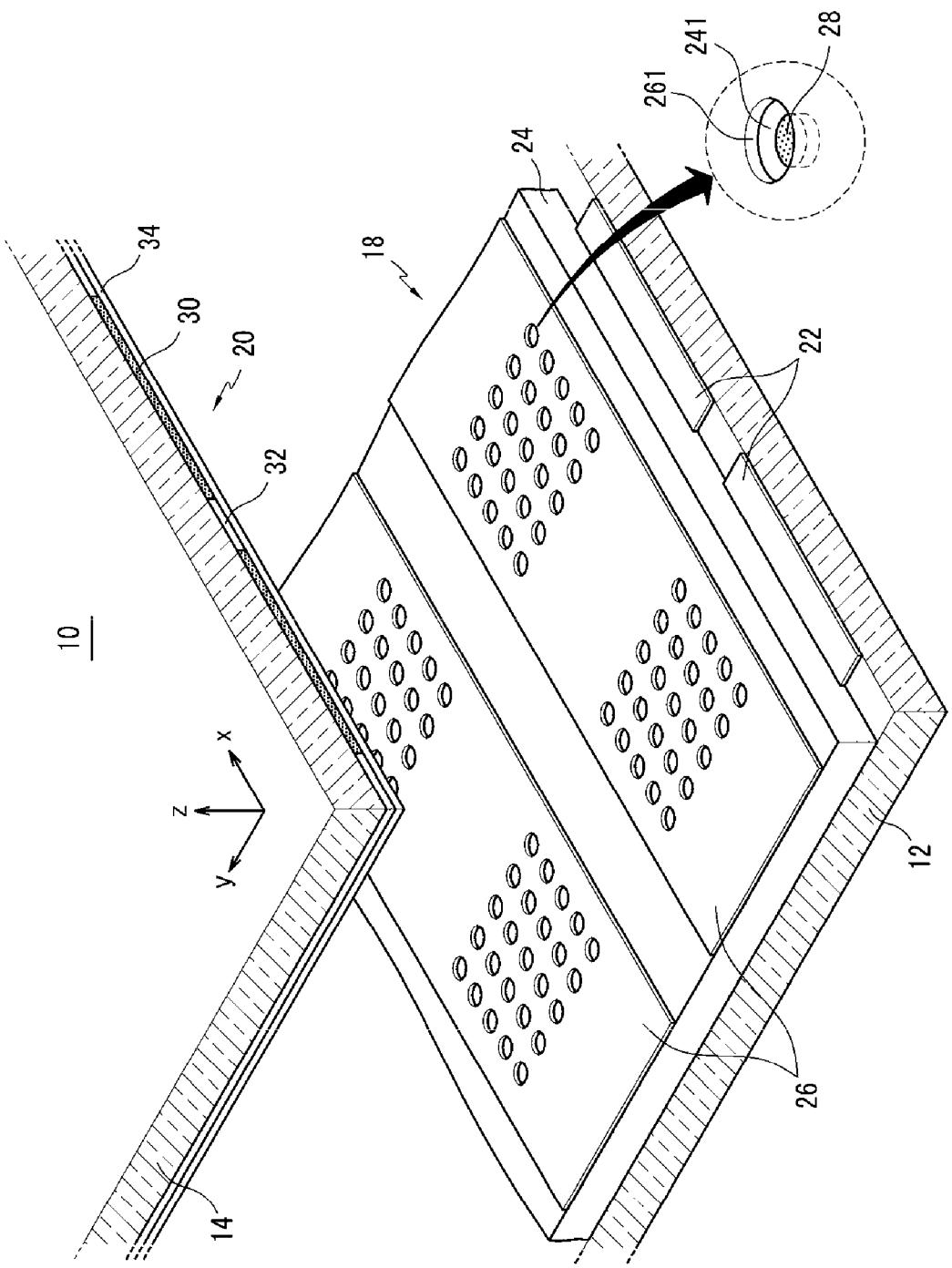
FIG. 2 is a partial exploded perspective view of the light emission device of FIG. 1.

FIG. 1 is a sectional view of a light emission device 10, according to an embodiment, and FIG. 2 is a partial exploded perspective view of the light emission device 10. Referring to FIG. 1, the light emission device 10 includes first and second substrates 12 and 14 facing each other, with a predetermined interval therebetween. A sealing member 16 is provided at the peripheries of the first and second substrates 12 and 14 to seal them together, and thus form a sealed envelope. The interior of the sealed envelope is kept to a degree of vacuum of about 10-6 Torr.

Each of the first and second substrates 12 and 14 has an active area emitting visible light, and an inactive area surrounding the active area, inside of the sealing member 16. An electron emission unit 18 to emit electrons is provided on the active area of the first substrate 12, and a light emission unit 20 to emit the visible light is provided on the active area of the second substrate 14.

Referring to FIG. 2, the electron emission unit 18 includes cathodes 22 (first electrodes) arranged in a striped pattern along the first substrate 12; gate electrodes 26 (second electrodes) arranged in a striped pattern across the cathodes 22; an insulating layer 24 arranged between the cathodes 22 and gate electrodes 26; and electron emission regions 28 electrically connected to the cathodes 22.

The cathodes 22 can be arranged in rows on the first substrate 12, and can be referred to as scan electrodes. Alternatively, the cathodes 22 can be arranged in columns on the first substrate 12, and can be referred to as data electrodes. Openings 261 and 241 are formed through the insulating layer 24 and the gate electrodes 26, at crossing regions of the cathodes 22 and gate electrodes 26, to partly expose the surface of the cathodes 22. The electron emission regions 28 are formed on the cathodes 22, through the openings 261 and 241 of the insulating layer 24.

The electron emission regions 28 are formed of a material that emits electrons, when an electric field is applied thereto under a vacuum, such as, a carbon-based material, or a nanometer-sized material. The electron emission regions 28 can be formed of carbon nanotubes, graphite, graphite nanofibers, diamonds, diamond-like carbon, fullerenes, silicon nanowires, or a combination thereof. The electron emission regions 28 can be formed through a screen-printing, a direct growth, a chemical vapor deposition, or a sputtering process. Alternatively, the electron emission regions can be formed as a tip structure formed of an Mo-based or an Si-based material.

One crossing region of the cathode 22 and gate electrode 26 may correspond to one pixel region of the light emission device 10. Alternatively, two or more crossing regions of the cathode 22 and gate electrode 26 may correspond to one pixel region of the light emission device 10. In this case, two or more cathodes 22 and/or two or more gate electrodes 26 that are placed in one pixel region are electrically connected to each other, to receive a common driving voltage.

The light emission unit 20 includes: phosphor layers 30 that are spaced apart in a predetermined pattern, on one surface of the second substrate 14; dark-colored layers 32 disposed between the phosphor layers 30; and metal reflective layers 34 disposed over the phosphor layers 30 and dark colored layers 32. The phosphor layers 30 may be formed on the entire surface of the second substrate 14, without the dark colored layers 32 being included between the phosphor layers 30.

The metal reflective layers 34 can be referred to as an anode. When the metal reflective layer 34 is an anode, it becomes an acceleration electrode that receives a high voltage to maintain the phosphor layer 30 at a high electric potential. The metal reflective layers 34 enhance the luminance, by reflecting visible light toward the second substrate 14, which is emitted from the phosphor layers 30 to the first substrate 12.

According to one embodiment, the anode is a transparent conductive layer formed of ITO (indium tin oxide). The anode is arranged between the second substrate 14 and phosphor layers 30, and may be formed in plural, in a predetermined pattern. According to another embodiment, both the transparent conductive layer and the metal reflective layer 34 may be an anode.

The phosphor layer 30 is a white phosphor layer to emit white light. The white phosphor layer includes the white phosphor according to one exemplary embodiment of the present invention. The white phosphor includes 40 to 45 parts by weight of a blue phosphor selected from the group consisting of $ZnS:(Ag,Cl)$, $ZnS:(Ag,Al)$, $ZnS:(Ag,Al,Cl)$, and combinations thereof; 30 to 40 parts by weight of a green phosphor selected from the group consisting of $ZnS:(Cu,Al)$, $ZnS:(Cu,Au,Al)$, and combinations thereof; and 20 to 25 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and combinations thereof.

One phosphor layer 30 may be disposed on each pixel region, or more than one phosphor layers 30 may be disposed on each pixel region. For example, one phosphor layer 30 may be disposed over two or more pixel regions. The phosphor layer 30 may be formed in a rectangular shape. Spacers (not shown) are disposed between the first and second substrates 12 and 14, to uniformly maintain a gap therebetween.

The light emission device 10 is driven when a voltage is applied from outside of the vacuum container, to the cathodes 22, the gate electrodes 26, and the anode. In FIG. 1, a gate lead line 36 extends from the gate electrodes 26, and an anode lead line 38 extends from the anode.

An electric field is formed around the electron emission regions 28, at pixel regions where a voltage difference between the cathodes 22 and gate electrodes 26 is higher than a threshold value, thereby emitting electrons from the electron emission regions 28. The emitted electrons are accelerated, by the high voltage applied to the metal reflective layer 34, to collide with the corresponding phosphor layers 30, thereby exciting the phosphor layers 30. The light emission intensity, of the phosphor layers 30 at each pixel, corresponds to an electron emission amount of the corresponding pixels.

Figure 3:
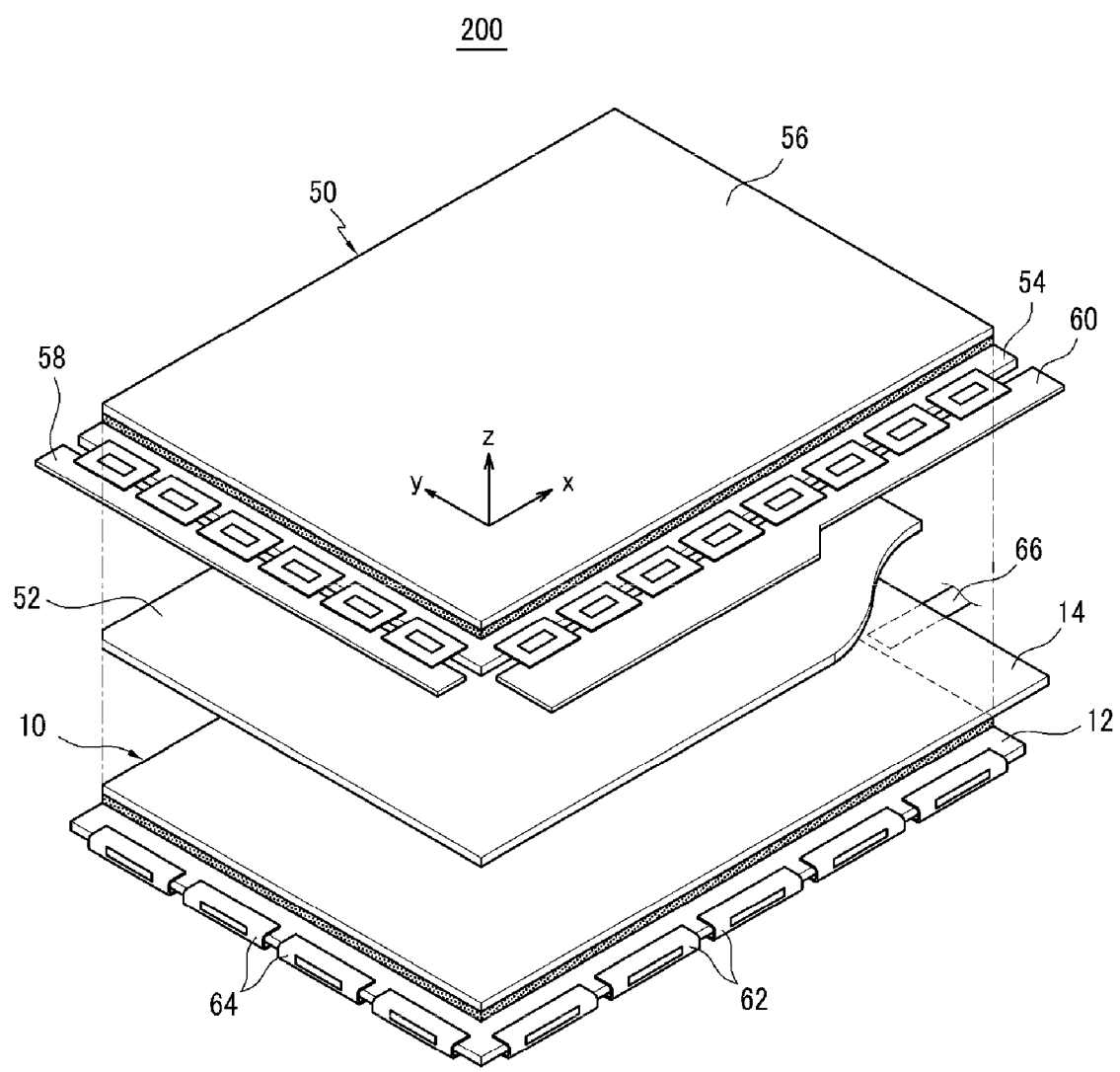
FIG. 3 is a partial exploded perspective view of the display device, according to one embodiment of the present invention.

FIG. 3 is an exploded perspective view of a display device 200, using the light emission device 10 illustrated in FIG. 2, as a backlight unit, according to one embodiment of the present invention. The same members in FIG. 3 as the members in FIG. 2 are assigned the same reference numerals. Referring to FIG. 3, the display device 200 includes the light emission device 10, and a display panel 50 located in front of the light emission device 10. A diffuser plate 52 to uniformly diffuse light emitted from the light emission device 10, to the display panel 50, may be located between the light emission device 10 and the display panel 50. The diffuser plate 52 is spaced apart from the light emission device 10.

A liquid crystal panel, or other light receiving types (not-emissive type) of display panels, may be used as the display panel 50. In the following description, a case where the display panel 50 is a liquid crystal panel will be explained as an example.

The display panel 50 includes a lower substrate 54 having a plurality of TFTs, an upper substrate 56 located above the lower substrate 54, and a liquid crystal layer (not shown) formed between the substrates 54 and 56. Polarizing plates (not shown) are attached on the upper substrate 56 and the lower substrate 54, to polarize light passing through the display panel 50.

The lower substrate 54 includes transparent pixel electrodes disposed at the internal surface thereof. The transparent pixel electrodes are operated under the control of the TFT, for each sub-pixel. The upper substrate 56 includes a color filter layer, and a transparent common electrode disposed at the internal surface thereof. The color filter layer includes a red filter layer, a green filter layer, and a blue filter layer for each sub-pixel.

When the TFT of a certain sub-pixel is turned on, an electric field is formed between the pixel electrode and the common electrode. The orientation of liquid crystal molecules, between the lower substrate 54 and the upper substrate 56, is thereby varied, resulting in corresponding changes in the light transmittance of the corresponding pixels. The display panel 50 can control the luminance and the color of light emitted from each pixel, through this process.

Referring to FIG. 3, the display device 200 includes a gate printed circuit board assembly 58 to transmit a gate driving signal to the gate electrode of each TFT, and a data printed circuit board assembly 60 to transmit a data driving signal to a source electrode of each TFT. The light emission device 10 includes a plurality of pixels, the number of which is less than the number of pixels of the display panel 50, so that one pixel of the light emission device 10 corresponds to two or more pixels of the display panel 50. Each pixel of the light emission device 10 emits light in at a highest gray level, among gray levels assigned to the pixels of the display panel 50. The light emission device 10 can represent a 2 to 8 bit gray level at each pixel.

For convenience, the pixels of the display panel 50 are referred to as first pixels, and the pixels of the light emission device 10 are referred to as second pixels. Each of the first pixels and a corresponding one of the second pixels are together referred to as a pixel group.

In a driving process of the light emission device 10, a signal control unit (not shown) to control the display panel 50 detects the highest gray level of the pixel groups; produces a gray level that corresponds to light needed to produce the light emitted from the second pixel, in response to the detected high gray level; and converts the operated gray level into digital data; generates a driving signal of the light emission device 10 using the digital data. The signal processing unit applies the generated driving signal to the driving electrode of the light emission device 10.

The driving signal of the light emission device 10 includes a scan driving signal and a data driving signal. One of the cathode electrode or the gate electrode (for example the gate electrode) receives a scan driving signal, and the other electrode (for example the cathode electrode) receives a data driving signal.

The gate printed circuit board assembly (PBA) 58 and the data printed circuit board assembly (PBA) 60 may be disposed on the back side of the light emission device 10. Referring to FIG. 3, display device 200 includes a first connection member 62 to connect the cathode to the data printed circuit board assembly (PBA) 60, and a second connection member 64 to connect the gate electrode to the gate printed circuit board assembly (PBA) 58. A third connection member 66 applies an anode voltage to the anode.

As described above, the second pixel of the light emission device 10 is synchronized with the associated pixel group, and emits light of a predetermined grayscale, when an image is displayed in the pixel group. The light emission device 10 provides light of a high luminance to a bright region an image realized by the display panel 50, and provides light of a low luminance to a dark region. Thus, the display device 200 can increase dynamic contrast of the image, and realize high image quality.

The following examples illustrate the aspects of the present invention in more detail. However, it is understood that the present invention is not limited by these examples.

(Manufacturing of Light Emission Device)

EXAMPLE 1

A white phosphor was prepared by mixing 23.8 parts by weight of a $Y_2O_3$:Eu red phosphor, 36.2 parts by weight of a ZnS:(Cu,Al) green phosphor, and 40.0 parts by weight of a ZnS:(Ag,Al) blue phosphor.

A rectangular electrode layer was formed on a substrate, and the white phosphor was applied to the entire surface of the substrate, to thereby prepare a white phosphor layer. Al was deposited on the surface of the substrate, on which the white phosphor layer was disposed, in a chemical vapor deposition method, to thereby form a metal reflective layer. The substrate, with the white phosphor layer and the metal reflective layer, was baked at 480° C., for about 0.5 to 1 hour, to thereby prepare a light emission unit.

A light emission device was manufactured in a conventional method using the above-prepared light emission unit.

EXAMPLE 2

The light emission device was fabricated according to the same method as in Example 1, except that 23.4 parts by weight of a $Y_2O_3$:Eu red phosphor, 35.8 parts by weight of a ZnS:(Cu,Al) green phosphor, and 40.8 parts by weight of a ZnS:(Ag,Al) blue phosphor were mixed, to provide a white phosphor.

EXAMPLE 3

The light emission device was fabricated according to the same method as in Example 1, except that 23.4 parts by weight of a $Y_2O_3$:Eu red phosphor, 35.1 parts by weight of a ZnS:(Cu,Al) green phosphor, and 41.5 parts by weight of a ZnS:(Ag,Al) blue phosphor were mixed, to provide a white phosphor.

EXAMPLE 4

The light emission device was fabricated according to the same method as in Example 1, except that 23.1 parts by weight of a $Y_2O_3$:Eu red phosphor, 34.6 parts by weight of a ZnS:(Cu,Al) green phosphor, and 42.3 parts by weight of a ZnS:(Ag,Al) blue phosphor were mixed, to provide a white phosphor.

EXAMPLE 5

The light emission device was fabricated according to the same method as in Example 1, except that 23.1 parts by weight of a $Y_2O_3$:Eu red phosphor, 33.8 parts by weight of a ZnS:(Cu,Al) green phosphor, and 43.1 parts by weight of a ZnS:(Ag,Al) blue phosphor were mixed, to provide a white phosphor.

The white phosphors according to Examples 1 to 5 are described in the following Table 1.

TABLE 1

|  | Phosphor | Example 1 | Example 2 | Example 3 | Example 4 | Example 5 |
| --- | --- | --- | --- | --- | --- | --- |
| Red phosphor | $Y_2O_3$:Eu | 23.8 | 23.4 | 23.4 | 23.1 | 23.1 |
| Green phosphor | ZnS:(Cu, Al) | 36.2 | 35.8 | 35.1 | 34.6 | 33.8 |

TABLE 1-continued

|  | Phosphor | Example 1 | Example 2 | Example 3 | Example 4 | Example 5 |
| --- | --- | --- | --- | --- | --- | --- |
| Blue phosphor | ZnS:(Ag, Al) | 40.0 | 40.8 | 41.5 | 42.3 | 43.1 |

EXAMPLE 6

The light emission device was fabricated according to the same method as in Example 1, except that $Y_2O_3$:(Eu,Tb) was used for a red phosphor.

EXAMPLE 7

The light emission device was fabricated according to the same method as in Example 1, except that $Y_2O_2S$:Eu was used for a red phosphor.

EXAMPLE 8

The light emission device was fabricated according to the same method as in Example 1, except that $Y_2O_2S$:(Eu,Tb) was used for a red phosphor.

EXAMPLE 9

The light emission device was fabricated according to the same method as in Example 1, except that ZnS:(Cu,Au,Al) was used for a green phosphor.

EXAMPLE 10

The light emission device was fabricated according to the same method as in Example 1, except that ZnS:(Ag,Cl) was used for a blue phosphor.

EXAMPLE 11

The light emission device was fabricated according to the same method as in Example 1, except that ZnS:(Ag,Al,Cl) was used for a blue phosphor.

(Light Emitting Characteristics of Manufactured Light Emission Devices)

The color temperature, luminance, color coordinates, and light emitting spectrum, of the light emitted from the light emission devices manufactured according to Examples 1 to 11, were measured using a contact-type photometer (CA-100®, produced by the Minolta Company).

The color temperature, luminance, and color coordinates, of the light emission device prepared according to Examples 1 to 5, are shown in the following Table 2, and the light emitting spectrum of the light emission device prepared according to Example 2 is presented in FIG. 4.

TABLE 2

|  | Color temperature (K) | Luminance (cd/m$^2$) | Color coordinate (x, y) |
| --- | --- | --- | --- |
| Example 1 | 11,058 | 8472 | 0.2540, 0.3171 |
| Example 2 | 11,378 | 8270 | 0.2523, 0.3157 |
| Example 3 | 11,979 | 8011 | 0.2502, 0.3105 |
| Example 4 | 12,542 | 7972 | 0.2485, 0.3059 |
| Example 5 | 13,429 | 7531 | 0.2467, 0.2999 |

Figure 4:
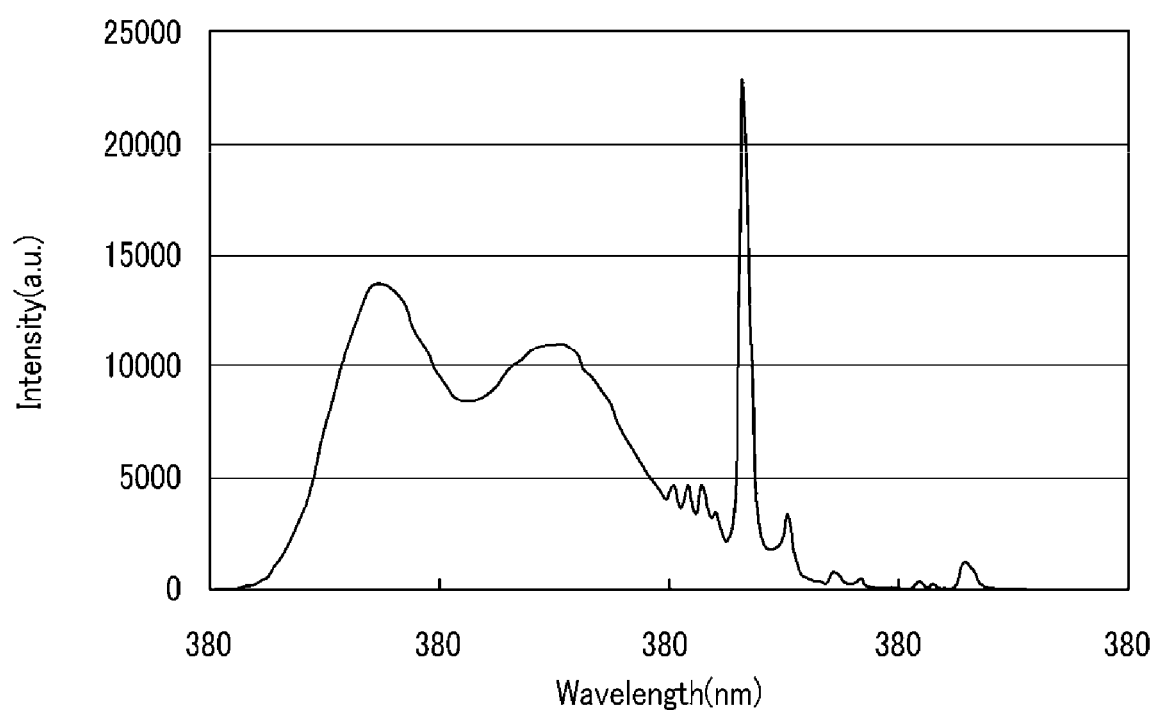
FIG. 4 shows light emitting spectra of the light emission unit according to Example 2 of the present invention.

It can be seen from Table 2 and FIG. 4 that the light emission devices emitted white light having a color temperature of from 11000 to 14,000K. The light emission devices prepared according to Examples 6 to 11 also emitted white light having a color temperature of from 11,000 to 14,000K.

According to the exemplary embodiments of the present invention, the white phosphor can be prepared by mixing a blue phosphor, a green phosphor, and a red phosphor. The white phosphor shows an appropriate color temperature by mixing the red, green, and blue phosphors, in a predetermined mixing ratio.

The light emission unit including the white phosphor can improve the luminescence characteristics of the light emission device. Furthermore, image quality, of the display device including the light emission device as a backlight unit, can also be improved.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A white phosphor comprising:
   40 to 45 parts by weight of a blue phosphor selected from the group consisting of ZnS:(Ag,Cl), ZnS:(Ag,Al), ZnS:(Ag,Al,Cl), and combinations thereof;
   30 to 40 parts by weight of a green phosphor selected from the group consisting of ZnS:(Cu,Al), ZnS:(Cu,Au,Al), and combinations thereof; and
   20 to 25 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and combinations thereof.

2. The white phosphor of claim 1, wherein the white phosphor has a color temperature of 11,000K to 14,000K.

3. The white phosphor of claim 1, wherein the white phosphor comprises 40 to 44 parts by weight of the blue phosphor, 32 to 37 parts by weight of the green phosphor, and 22 to 25 parts by weight of the red phosphor.

4. The white phosphor of claim 3, wherein the white phosphor has a color temperature of 11,000K to 14,000K.

5. The white phosphor of claim 1, wherein the white phosphor comprises 41 to 43 parts by weight of the blue phosphor, 33 to 36 parts by weight of the green phosphor, and 23 to 24 parts by weight of the red phosphor.

6. The white phosphor of claim 5, wherein the white phosphor has a color temperature of 12,000K to 14,000K.

7. A light emission device comprising:
   first and second substrates arranged opposite to each other;
   an electron emission unit disposed on a surface of the first substrate; and
   a light emission unit disposed on a surface of the second substrate,
   wherein the light emission unit comprises a phosphor layer, the phosphor layer comprising a while phosphor comprising 40 to 45 parts by weight of a blue phosphor selected from the group consisting of ZnS:(Ag,Cl), ZnS:(Ag,Al), ZnS:(Ag,Al,Cl), and combinations thereof; 30 to 40 parts by weight of a green phosphor selected from the group consisting of ZnS:(Cu,Al), ZnS:(Cu,Au,Al), and combinations thereof; and 20 to 25 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and combinations thereof.

8. The light emission device of claim 7, wherein the white phosphor has a color temperature of 11,000K to 14,000K.

9. The light emission device of claim 7, wherein the white phosphor comprises 40 to 44 parts by weight of the blue phosphor, 32 to 37 parts by weight of the green phosphor, and 22 to 25 parts by weight of the red phosphor.

10. The light emission device of claim 9, wherein the white phosphor has a color temperature of 11,000K to 14,000K.

11. The light emission device of claim 7, wherein the white phosphor comprises 41 to 43 parts by weight of the blue phosphor, 33 to 36 parts by weight of the green phosphor, and 23 to 24 parts by weight of the red phosphor.

12. The light emission device of claim 11, wherein the white phosphor has a color temperature of 12,000K to 14,000K.

13. The light emission device of claim 7, wherein the light emission unit comprises an anode comprising a metal reflective layer disposed on the phosphor layer.

14. The light emission device of claim 7, wherein the light emission unit comprises:
   a phosphor layer disposed on the surface of the second substrate;
   an anode comprising a transparent conductive layer disposed between the second substrate and phosphor layer; and
   a metal reflective layer disposed on the phosphor layer.

15. The light emission device of claim 7, wherein the electron emission unit comprises:
   a first electrode disposed on the first substrate in a first direction;
   a second electrode disposed across the first electrode;
   an insulating layer disposed between the first and second electrodes; and
   an electron emission region electrically connected to the first electrode.

16. The light emission device of claim 15, wherein the electron emission region comprises one selected from the group consisting of a carbon-based material, a nanometer-sized material, and combinations thereof.

17. A display device comprising:
   a light emission device comprising,
      first and second substrates disposed opposite to each other,
      an electron emission unit disposed on a surface of the first substrate, and
      a light emission unit disposed on a surface of the second substrate,
      wherein the light emission unit comprises a phosphor layer, the phosphor layer comprising a white phosphor comprising 40 to 45 parts by weight of a blue phosphor selected from the group consisting of ZnS:(Ag,Cl), ZnS:(Ag,Al), ZnS:(Ag,Al,Cl), and combinations thereof; 30 to 40 parts by weight of a green phosphor selected from the group consisting of ZnS:(Cu,Al), ZnS:(Cu,Au,Al), and combinations thereof; and 20 to 25 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and combinations thereof; and
   a display panel assembly disposed on the light emission device, to receive light emitted from the light emission device, so as to display an image.

18. The display device of claim 17, wherein the display panel is a liquid crystal display panel.

19. The display device of claim 17, wherein the white phosphor has a color temperature of 11,000K to 14,000K.

20. The display device of claim 17, wherein the white phosphor comprises 40 to 44 parts by weight of the blue phosphor, 32 to 37 parts by weight of the green phosphor, and 22 to 25 parts by weight of the red phosphor.

21. The display device of claim 20, wherein the white phosphor has a color temperature of 11,000K to 14,000K.

22. The display device of claim 17, wherein the white phosphor comprises 41 to 43 parts by weight of the blue phosphor, 33 to 36 parts by weight of the green phosphor, and 23 to 24 parts by weight of the red phosphor.

23. The display device of claim 22, wherein the white phosphor has a color temperature of 12,000K to 14,000K.

* * * * *

UNITED STATES PATENT AND TRADEMARK OFFICE
CERTIFICATE OF CORRECTION

| | | |
|---|---|---|
| PATENT NO. | : 7,952,266 B2 | Page 1 of 1 |
| APPLICATION NO. | : 12/186844 | |
| DATED | : May 31, 2011 | |
| INVENTOR(S) | : Yong-Chan You et al. | |

It is certified that error appears in the above-identified patent and that said Letters Patent is hereby corrected as shown below:

In the Claims

Column 9, Claim 7, line 54.        Delete "while"
        Insert -- white --

Signed and Sealed this
Eighth Day of May, 2012

David J. Kappos
*Director of the United States Patent and Trademark Office*